United States Patent
Lee et al.

(10) Patent No.: US 9,171,380 B2
(45) Date of Patent: Oct. 27, 2015

(54) CONTROLLING POWER CONSUMPTION IN OBJECT TRACKING PIPELINE

(75) Inventors: Kyungsuk David Lee, Redmond, WA (US); Mark Finocchio, Redmond, WA (US); Richard Moore, Redmond, WA (US); Alexandru Balan, Redmond, WA (US); Rod G. Fleck, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 687 days.

(21) Appl. No.: 13/312,846

(22) Filed: Dec. 6, 2011

(65) Prior Publication Data

US 2013/0141597 A1  Jun. 6, 2013

(51) Int. Cl.
| | |
|---|---|
| H04N 5/232 | (2006.01) |
| G06T 7/20 | (2006.01) |
| H04N 5/235 | (2006.01) |
| H04N 5/345 | (2011.01) |
| G06K 9/00 | (2006.01) |

(52) U.S. Cl.
CPC .......... *G06T 7/2046* (2013.01); *G06K 9/00362* (2013.01); *H04N 5/2354* (2013.01); *H04N 5/23219* (2013.01); *H04N 5/23241* (2013.01); *H04N 5/23254* (2013.01); *H04N 5/345* (2013.01); *G06T 2207/10016* (2013.01); *G06T 2207/20144* (2013.01); *G06T 2207/20224* (2013.01); *G06T 2207/30196* (2013.01)

(58) Field of Classification Search
USPC ......................................... 348/207.11, 222.1
See application file for complete search history.

(56) References Cited

U.S. PATENT DOCUMENTS

| | | | |
|---|---|---|---|
| 2004/0001220 A1* | 1/2004 | Gorday et al. | 358/1.15 |
| 2004/0008267 A1 | 1/2004 | Chen et al. | |
| 2005/0023356 A1 | 2/2005 | Wiklof et al. | |
| 2005/0129316 A1 | 6/2005 | Curti et al. | |
| 2006/0087502 A1 | 4/2006 | Karidis et al. | |
| 2006/0261256 A1* | 11/2006 | Holmes et al. | 250/214 SW |
| 2006/0274170 A1* | 12/2006 | Azuma | 348/246 |
| 2007/0076957 A1* | 4/2007 | Wang et al. | 382/195 |
| 2008/0008396 A1 | 1/2008 | Kisilev et al. | |
| 2008/0129844 A1* | 6/2008 | Cusack et al. | 348/241 |
| 2009/0225164 A1* | 9/2009 | Renkis | 348/143 |
| 2009/0237528 A1* | 9/2009 | Kawamura et al. | 348/231.99 |

(Continued)

FOREIGN PATENT DOCUMENTS

JP     2001109422 A  *  4/2001  ............... G09G 3/20

OTHER PUBLICATIONS

Shim, et al., "A Backlight Power Management Framework for Battery-Operated Multimedia Systems", Retrieved at <<http://citeseerx.ist.psu.edu/viewdoc/download?doi=10.1.1.60.8328&rep=repl&type=pdf>>, IEEE Design and Test of Computers, Special Issue on Embedded Systems for Real-Time Multimedia, Sep. 2004, pp. 1-9.

*Primary Examiner* — Roberto Velez
*Assistant Examiner* — Yih-Sien Kao
(74) *Attorney, Agent, or Firm* — Dan Choi; Judy Yee; Micky Minhas

(57) ABSTRACT

Embodiments related to detecting object information from image data collected by an image sensor are disclosed. In one example embodiment, the object information is detected by receiving a frame of image data from the image sensor and detecting a change in a threshold condition related to an object within the frame. The embodiment further comprises adjusting a setting that changes a power consumption of the image sensor in response to detecting the threshold condition.

20 Claims, 5 Drawing Sheets

(56) References Cited

U.S. PATENT DOCUMENTS

| | | |
|---|---|---|
| 2010/0092031 A1 | 4/2010 | Bergeron et al. |
| 2011/0007939 A1 | 1/2011 | Teng et al. |
| 2011/0085703 A1 | 4/2011 | Wiedemann et al. |
| 2011/0289455 A1* | 11/2011 | Reville et al. ............... 715/830 |
| 2012/0014564 A1* | 1/2012 | Jensen ........................ 382/106 |

* cited by examiner

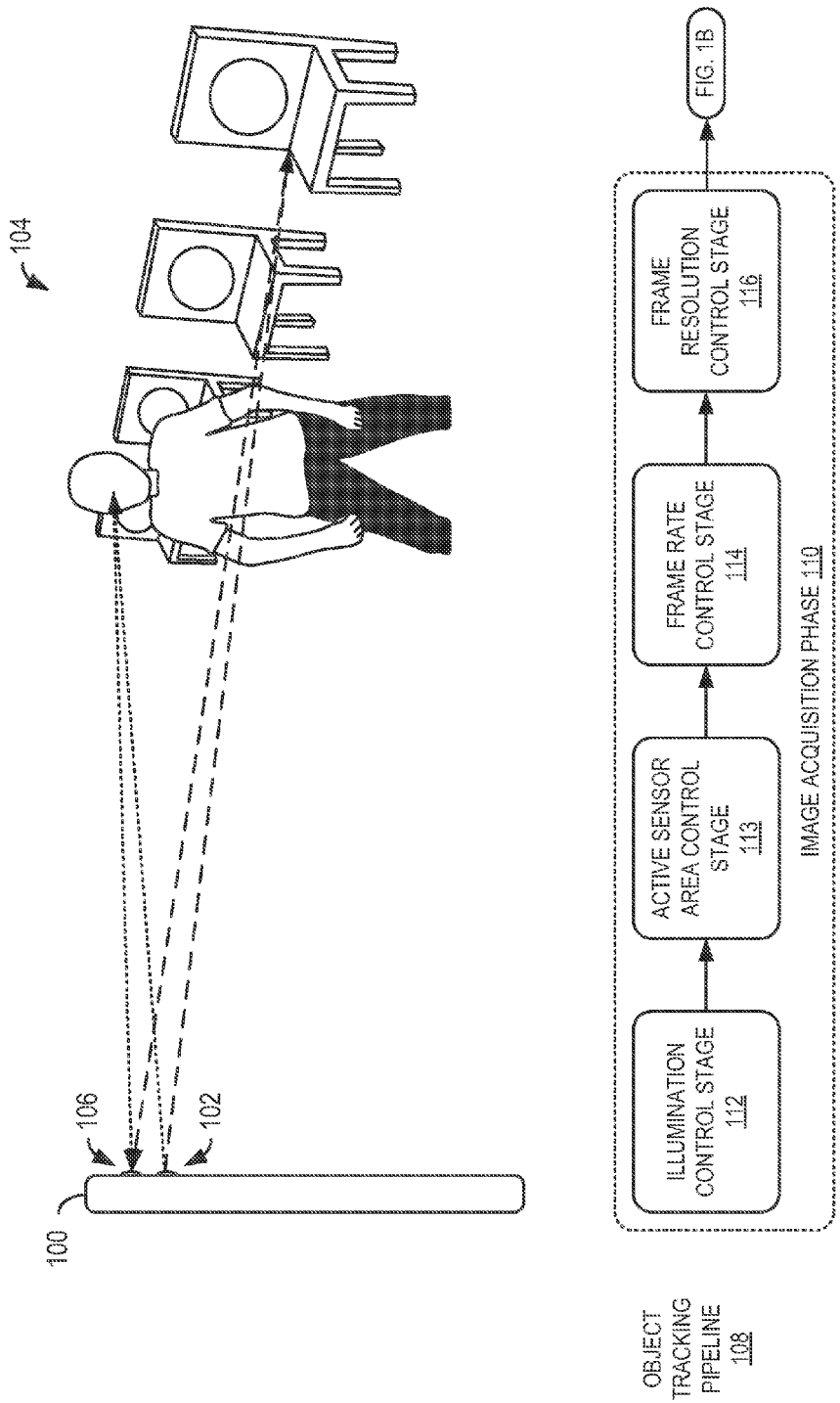

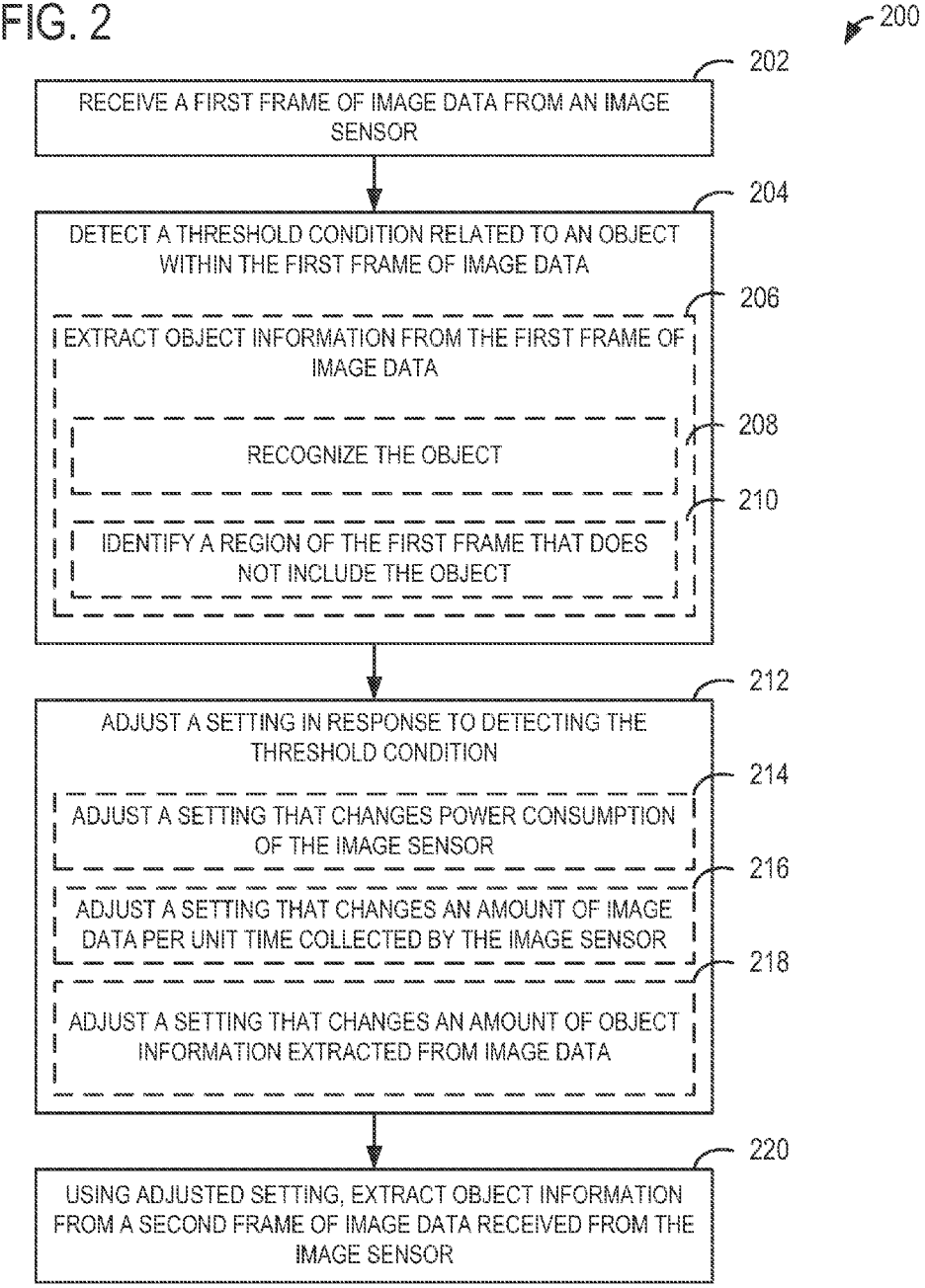

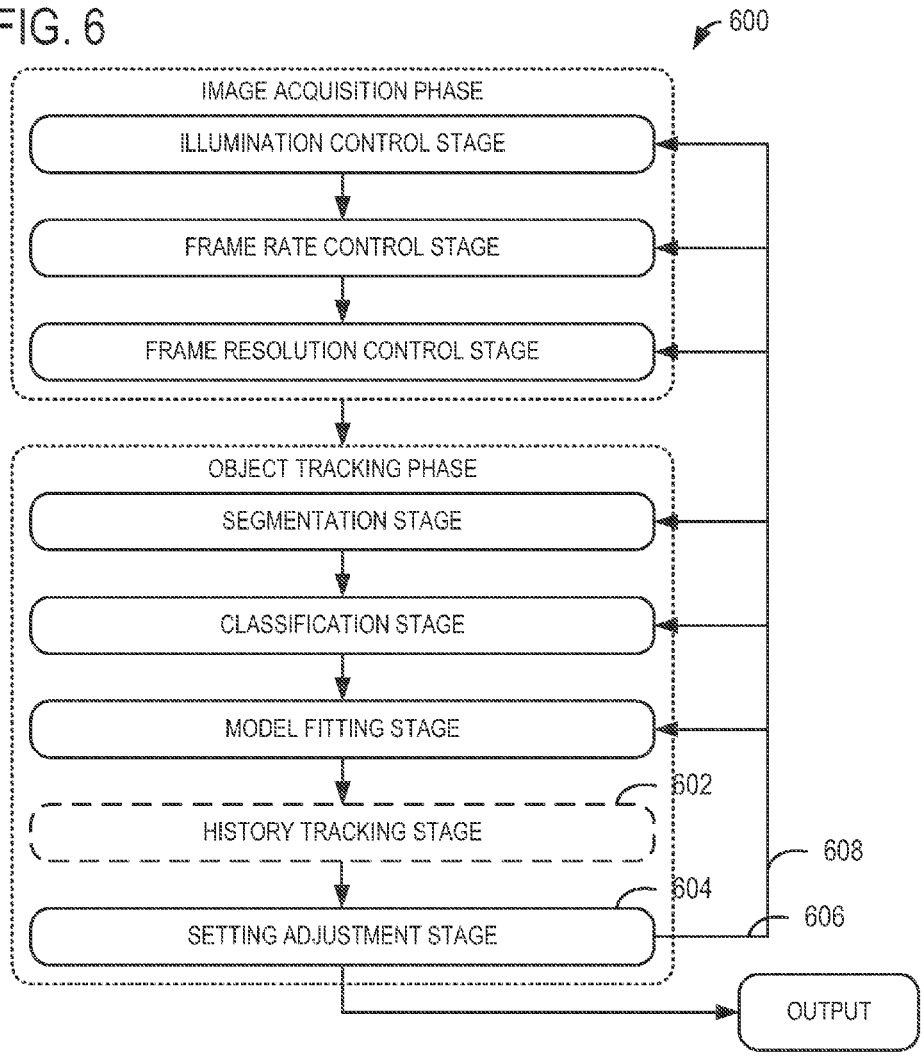
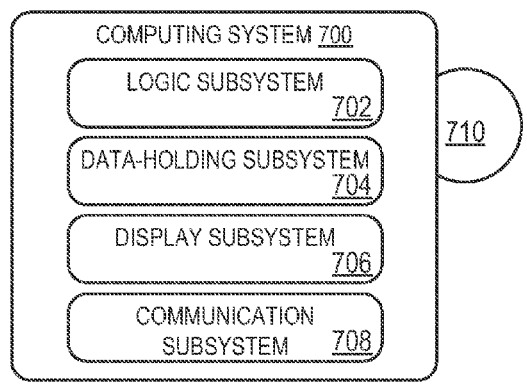

CONTROLLING POWER CONSUMPTION IN OBJECT TRACKING PIPELINE

BACKGROUND

Manage battery life in a mobile device equipped with a visual input sensor may pose challenges. Continuous image capture may require that the device keep track of lighting, focus, and resolution variables while writing the image data to memory. As a result, the mobile device may experience a large current draw during sensor operation. Further, the large current draw may cause the battery and/or microprocessors inside of the mobile device to become hot, potentially reducing the lifetime of the battery and/or the microprocessor.

SUMMARY

Embodiments related to detecting object information from image data collected by an image sensor are disclosed. For example, one disclosed embodiment comprises receiving a frame of image data from the image sensor and detecting a change in a threshold condition related to an object within the frame. The embodiment further comprises adjusting a setting that changes a power consumption of the image sensor in response to detecting the threshold condition.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIGS. 1A and 1B schematically illustrate a pipeline for tracking an object according to an embodiment of the present disclosure.

FIG. 2 shows a flowchart depicting a method of adjusting a setting for tracking an object according to an embodiment of the present disclosure.

FIG. 6 schematically shows another pipeline for tracking an object according to an embodiment of the present disclosure.

FIG. 7 schematically shows a computing device according to an embodiment of the present disclosure.

DETAILED DESCRIPTION

Figure 1B:
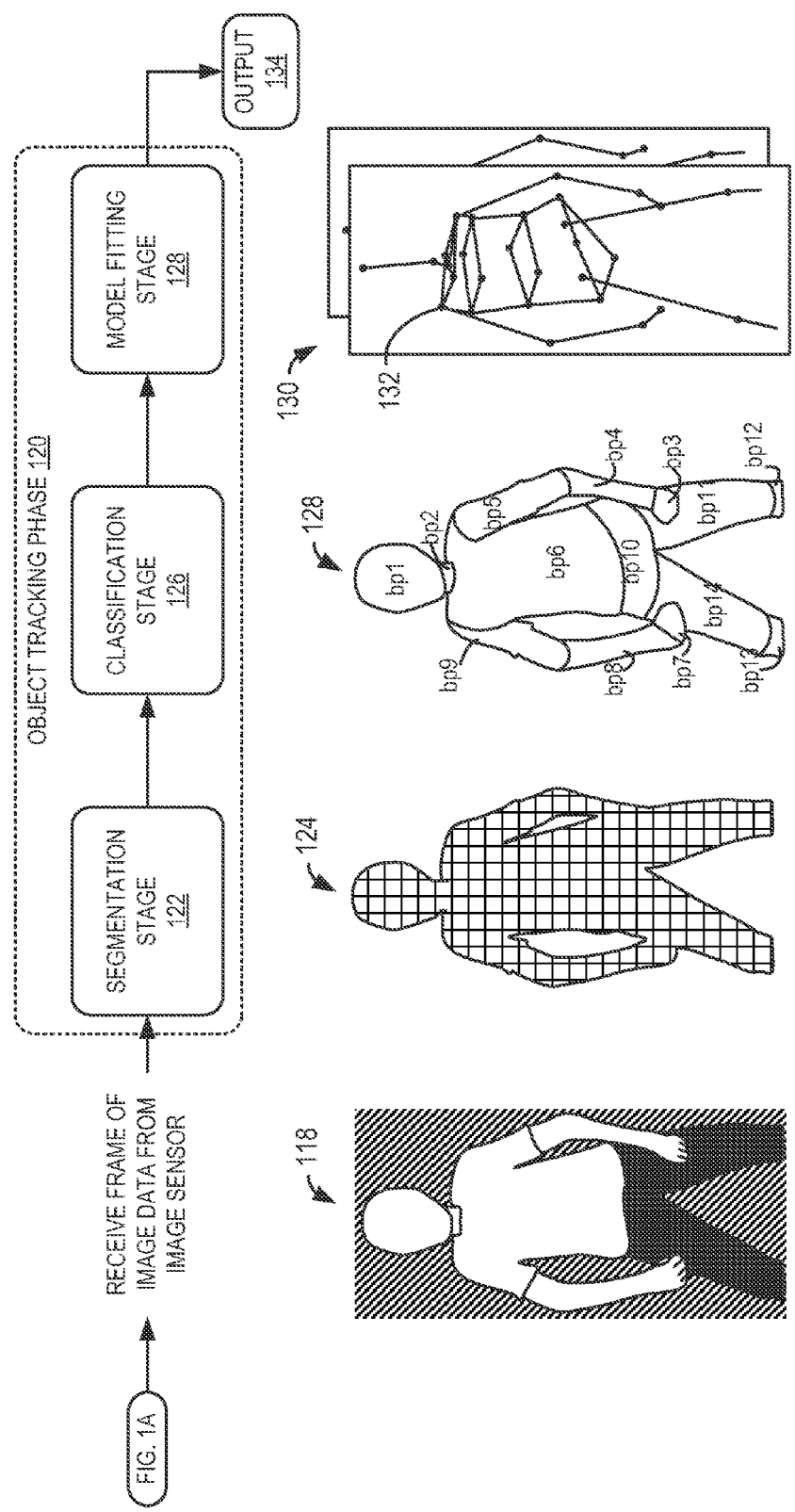

Tracking objects often involves capturing a large amount of image data over a short period of time. As such, it may be computationally intensive to track discrete objects from frame-to-frame. These challenges may be magnified for mobile devices, where power supply and form factor considerations may complicate some approaches to addressing the computational demands.

Thus, the disclosed embodiments relate to the detection of object information from image data collected by an image sensor and to adjusting one or more settings that change an image collection, and/or an image processing setting in response to detecting a change in a threshold condition related to the object. For example, in some embodiments, a hardware setting may be adjusted that changes power consumption for the image sensor. As another example, in some embodiments, a software (or firmware) setting may be adjusted that changes an amount power expended during image data processing. Such adjustments may allow dynamic management of power consumption rates and/or image data collection rates based how an object moves in a series of frames, where an object is positioned within an individual frame, a comparison between a target detail resolution and/or motion resolution for the object and respective observed resolutions for the object, and so on.

As the adjustments to such settings may reduce power consumption for an image acquisition device, such as a mobile computing device, the disclosed embodiments have the potential to extend power supply duration. Further, real-time or near real-time adjustment of image data acquisition and processing may be realized. In some examples, a mobile device may conserve power when an object is not being tracked, rapidly scale image data acquisition and/or processing resources according to motion characteristics and/or processed image data targets for the object, and/or throttle back down when the object leaves a field of view for the device. This also may reduce heat generation within the device, which may extend the overall lifetime of the power supply (for example, in the case of a battery pack), and/or of other components included in the device that may be affected by heat, such as solid state devices and/or display devices.

FIGS. 1A and B schematically show an embodiment of a computing device 100 for acquiring image data and for tracking one or more objects in the acquired image data, and also illustrate an image data acquisition and processing pipeline. As depicted in the embodiment shown in FIG. 1A, computing device 100 may represent any suitable computing device. Non-limiting examples of computing device 100 may include mobile computing devices such as mobile phones, portable media players, tablet computers, head-mounted displays, and laptop computers.

In the embodiment shown in FIG. 1A, computing device 100 may include a light source 102 that provides illumination light to a scene 104 and an image sensor 106 that captures, for conversion into image data, a portion of the illumination light reflected from scene 104. The light source 102 may emit any suitable wavelength of light, including but not limited to visible and/or infrared wavelengths, and may emit coherent and/or incoherent light. The image data may include color information, such as RGB, CMYK, and/or IR information for scene 104, and/or gray scale information. For example, each frame of image data may be divided into a plurality of pixels that locate, within the frame, color information for scene 104.

In some settings, the image data may include depth information for scene 104 in addition to or in place of the color information described above. Depth information assigned to each pixel may provide spatial location information for objects imaged within the frame. In some embodiments, depth information may be collected to track an object therein. Any suitable object may be tracked. In some embodiments, one or more human users may be tracked while the players interact with an application running on computing device 100. Tracking articulated objects, like the arms or legs of human users, may allow the physical movements of the articulated objects to act as user inputs to the application.

Accordingly, in some embodiments, depth information may be collected to track an articulated object in a frame.

Any suitable light source 102 and image sensor 106 may be used to collect image data from scene 104. For example, in some embodiments, pulsed infrared light may be emitted from light source 102 and a corresponding reflected light pulse may be captured at image sensor 106, providing depth information for the scene via time-of-flight and/or phase difference analysis of the light pulses. Depth information may also be generated by analyzing structured light emitted by light source 102 and collected by image sensor 106. As yet another example, depth information may be collected by stereo vision approaches, where image sensor 106 includes suitable stereo cameras. In some embodiments, image sensor 106 may include one or more video cameras, (e.g., one or more RGB, CMYK, gray scale, or IR cameras), for collecting color information from scene 104.

The embodiment of the pipeline 108 shown in FIGS. 1A and 1B includes six stages. For illustrative purposes, these stages are grouped into two phases. It will be appreciated that the stages and phases illustrated and described herein are non-limiting conceptual aids. In some embodiments, the processes described herein may occur concurrently and/or in alternative arrangements. Further, in some embodiments, some of the processes described herein may be omitted. Thus, while the embodiment of pipeline 108 may accurately track one or more objects within the field of view of image sensor 106, potentially providing an engaging user experience, the embodiment depicted in FIGS. 1A and 1B and described herein is provided for illustrative purposes only and is not meant to be limiting in any sense.

As shown in FIG. 1A, pipeline 108 includes an image acquisition phase 110. In the example shown in FIG. 1A, image acquisition phase 110 includes the stages of pipeline 108 that manage image acquisition hardware, such light source 102 and image sensor 106. As shown, image acquisition phase 110 includes an illumination control stage 112, an active sensor area control stage 113, a frame rate control stage 114, and a frame resolution control stage 116.

Illumination control stage 112 manages the emission of illumination light and, in some embodiments, may have an effect on the collection of reflected illumination light. In some embodiments, illumination control stage 112 may operatively control light source 102 via suitable light source control settings. For example, in some embodiments, adjustments to one or more of a light source intensity setting (in specific regions of the image frame or globally across the image frame) and a pulse frequency setting may be made at illumination control stage 112. Additionally or alternatively, in some embodiments, illumination control stage 112 may control a direction at which light may be emitted from light source 102 and/or an area of image sensor 106 or a portion of image sensor 106 that is exposed to reflected illumination light. For example, in some embodiments, a plurality of light sources 102 may be provided, each light source 102 being directed, actively and/or passively, so that a portion of image sensor 106 is illuminated by reflected illumination light. In one non-limiting example, four light sources 102 may be arranged in-line to illuminate four respective portions (e.g., a left portion, a left-middle portion, a right-middle portion, and a right portion) of an image sensor 106.

Active sensor area control stage 113 manages operation of active areas of image sensor 106. For example, in some embodiments, active sensor area control stage 113 may selectively activate portions of image sensor 106, while other portions of image sensor 106 are inactive, potentially saving power. Additionally or alternatively, in some embodiments, active sensor area control stage 113 may operate a plurality of pixels within image sensor 106 to act as one virtual pixel, potentially increasing the sensitivity of image sensor 106.

Frame rate control stage 114 manages the rate at which frames of image data are collected per unit time, referred to herein as a frame capture rate. In some embodiments, frame rate control stage 114 may operatively control image sensor 106, and in some embodiments, image sensor 106 and light source 102, via suitable adjustments thereto that result in changes to the frame capture rate. In one non-limiting example, thirty frames per second of image data may be captured by image sensor 106. In some other examples, image data may be captured at less than thirty frames per second, while in still other examples, image data may be captured at or more than thirty frames per second.

Frame resolution control stage 116 manages the resolution at which frames of image data are collected. In some embodiments, collection resolution may be expressed as a pixel density (e.g., 130 pixels per inch), as a frame dimension (e.g., 1920 pixels×1080 pixels), as a number of lines of video (e.g., 1080p or 1080i). In some embodiments, frame resolution control stage 116 may suitably adjust image sensor 106 to vary the collection resolution of image data.

Turning to FIG. 1B, frames of image data collected from the image sensor, such as an example frame 118 shown in FIG. 1B, are received by an object tracking phase 120 of pipeline 108. Object tracking phase 120 includes the stages of pipeline 108 that manage identifying and extracting information about objects in frame 118. As shown, object tracking phase 120 may include segmentation stage 122, classification stage 126, and model fitting stage 128.

Segmentation stage 122 distinguishes objects within the frame from other objects that occupy background regions of the frame. As used herein, the term background refers to anything in the frame that is not a part of the object being tracked, even if the background object is positioned in front of the object being tracked. Distinguishing objects being tracked from background objects may increase tracking efficiency or simplify downstream processing. In the example shown in FIG. 1B, background objects have been removed from frame 118, leaving image data for an articulated object 124 to be passed to classification stage 126. Thus, segmentation stage 122 may extract object information from a frame of image data. In one example, a pixel associated with an upper right arm of the articulated object 124 shown in FIG. 1B may be stored with image data including one or more of a pixel address, color information, and depth information.

Classification stage 126 analyzes an object to determine what kind of object the image data associated with it represents. For example, each pixel of the image data associated with articulated object 124 may be assessed to determine a body part with which that pixel belongs. In the embodiment shown in FIG. 1B, the image data associated with articulated object 124 is depicted as a classified structure 128. Thus, classification stage 126 may extract object information from a frame of image data. In some embodiments, classification stage 126 may supplement object information extracted in segmentation stage 122. Continuing with the example upper right arm pixel information described above, the pixel address, color information, and depth information may be supplemented with a body part index (labeled bp9 in the example shown in FIG. 1B) and a confidence value associated with the classification.

Model fitting stage 128 finds one or more possible models that act as machine representations of articulated object 124. Suitable models may include volumetric representations of objects (e.g., ellipsoidal, cuboidal, and/or polygonal representations of objects), skeletal representations of objects (e.g., ball and stick representations of objects), and so on.

In the example shown in FIG. 1B, a skeleton 130 is used as a machine representation of articulated object 124. Skeleton 130 may have a lower dimensionality than articulated object 124, even if scaled to approximately the same spatial representation, and may increase downstream processing as a result. In some embodiments, each joint of skeleton 130 may have a three-dimensional coordinate locating that joint within the frame of image data. Thus, model fitting stage 128 may extract object information from a frame of image data, and may supplement object information extracted in segmentation stage 122 and/or classification stage 126 in some embodiments. Continuing the example upper right arm, a shoulder joint (labeled 132 in FIG. 1B) may be fit by a suitable model fitting routine and stored in a data structure along with color information and depth information for that location.

It will be appreciated that suitable object motion information for the object may also be extracted at one or more of the stages within object tracking phase 120 in some embodiments. Extracting motion information may permit kinetic information for the object to be extracted and/or modeled. In turn, the kinetic information may provide user input to computing device 100 and/or information about projected movement of the object. For example, extracted kinetic information may be used to generate a motion vector for the object. In some settings, motion vector information may be provided via APIs and the like to consumers. In one scenario, a motion vector for a user's arm may be provided to a boxing game application that uses the information to determine whether the user landed a knockout blow to an opponent. In some other settings, motion vector information may be consumed by pipeline 108 and/or computing device 100. For example, a motion vector for the user's arm may be used to determine potential trajectories for the user's arm.

Once fit at model fitting stage 128, the model (for example, skeleton 130 in the example shown in FIG. 1B) may be provided to other applications as output 134 from pipeline 108. Output 134 may be consumed in any suitable manner by a receiving application. For example, in some embodiments, an application programming interface may receive output 134 and communicate the model and/or other image data information related to the model included in output 134 to a receiving application, such as gaming application. The receiving application may then use communicated output 134 in any suitable way. It will be understood that, in some embodiments, only a portion of a model may be provided as output. Further, it will be understood that the pipeline described with reference to FIG. 1 is presented for the purpose of example, and is not intended to be limiting in any manner.

FIG. 2 shows a flowchart for an embodiment of a method 200 of adjusting a setting for a pipeline for tracking an object, including but not limited to articulated objects such as those described above. Method 200 may be used, for example, to gather information for an object detected in a current frame and use the information gathered to adjust sensor input and/or image processing parameters for a subsequently collected frame. Embodiments of method 200 may be used to adjust pipeline settings dynamically, so that object information gathered from one frame may be used to adjust such settings for another frame on the fly. It will be appreciated that method 200 may be used with any suitable hardware or software, including but not limited to the hardware and software disclosed herein. Further, in some embodiments, some of the processes illustrated in the example method 200 depicted in FIG. 2 and described herein may be rearranged in alternate orders, including parallel and/or other non-sequential orders.

Further still, in some embodiments, some of the processes shown and described related to method 200 may be omitted. Accordingly, it will be appreciated that any suitable variation of method 200, including the variations described above, may be contemplated as being within the scope of the present disclosure.

At 202, method 200 includes receiving a frame of image data from the image sensor and, at 204, detecting an object within the frame. As used herein, detecting an object may refer to detecting a threshold condition related to an object in an image frame. Any suitable threshold condition may be detected. For example, the threshold condition may correspond to a change in presence or absence of an object in the image frame. As another example, the threshold condition may comprise a change in image data characteristics that may increase or decrease a difficulty of recognizing the object at the current settings. Such characteristics may relate to size, speed of motion (e.g. blur), orientation, and/or any other suitable characteristics of the object in the image frame. Such detection of the threshold condition may occur at any suitable stage within a pipeline for tracking an object. For example, in some embodiments, the object may be detected at a pipeline stage related to image data acquisition. In some other embodiments, the object may be detected at a pipeline stage related to extracting and/or processing acquired image data.

In some embodiments, detecting the threshold condition may include, at 206, extracting object information for the object from the first frame of image data. It will be appreciated that the object information may be extracted from the image data in any suitable manner. For example, in some embodiments, the object information may be extracted at a suitable stage in a pipeline for tracking one or more objects. Example stages include, but are not limited to, segmentation stages, classification stages, and model fitting stages such as those described herein.

In some embodiments, object motion information may be extracted from a plurality of frames. For example, a series of frames including a particular object may provide image data from which kinetic and/or other motion information for that object may be extracted.

In some embodiments, extracting object information at 206 may include, at 208, recognizing the object. For example, the object information extracted may include information that allows the image data associated with the object to be recognized, identified, classified, and/or fit to one or more model candidates. In such embodiments, recognition may occur at any suitable stage within a pipeline for tracking an object, including segmentation, classification, and/or model fitting stages like those described herein.

In some embodiments, extracting articulating information at 206 may include, at 210, identifying a background region of the frame that excludes the object. In some of such embodiments, identification of the background region may be performed in response to recognition of the object. For example, identification of an object at a segmentation stage may occur concurrently with identification of a background region. Identifying such background regions may permit those regions to be ignored during downstream processing, potentially simplifying downstream processing and/or improving tracking efficiency. In turn, improved processing may conserve power and extend power supply duration.

At 212, method 200 includes adjusting a setting in response to detecting the threshold condition in one or more frames of image data. It will be appreciated that any suitable setting related to a pipeline for tracking an object may be adjusted without departing from the scope of the present disclosure. As used herein, a setting may refer to a hardware setting and/or a software setting. A hardware setting may refer to one or more settings that control operational aspects of an image data acquisition device. Any suitable device setting may be adjusted without departing from the scope of the present disclosure. Non-limiting examples of hardware settings include device illumination settings, device frame rate settings, and device frame resolution settings.

A software setting may refer to one or more settings that control operational aspects of an image processing pipeline. Any suitable software setting may be adjusted without departing from the scope of the present disclosure. Non-limiting examples of image processing pipeline settings include segmentation resolution settings, classification resolution settings, and model fitting resolution settings.

It will be appreciated that hardware and software settings may be related in some embodiments. For example, an image resolution may be adjusted in hardware by sampling a lesser number of pixels and/or logically tying groups of pixels together, and in software by downsampling an image after acquisition.

In some embodiments, adjusting a setting at 212 may include, at 214, adjusting a setting that changes a power consumption of an image acquisition device, in response to detecting the object. Any suitable setting may be adjusted to change the power consumption of the image acquisition device, including but not limited to hardware settings changes that affect the power consumption of a light source, an image sensor, a camera, and/or other hardware components. For example, an adjustment may be made that increases power consumption of a camera in response to detecting a change in a threshold condition that indicates that more image data would be helpful for object tracking. By maintaining power settings at a lower consumption setting unless and until more information is desired, power may be conserved both by reducing hardware usage, and reducing an amount of data provided for downstream processing of image frames.

As a more specific example, in some embodiments, settings for collecting image data for selected portions of an image frame data may be configured to operate at reduced power levels (e.g. reduced illuminating settings and/or resolution settings) as a default state until an initial presence of the object is detected and/or recognized within a field of view of the image acquisition device. Once the initial presence of the object is detected, the settings may be adjusted so that power levels are increased to thereby obtain better data for object tracking.

Figure 3:
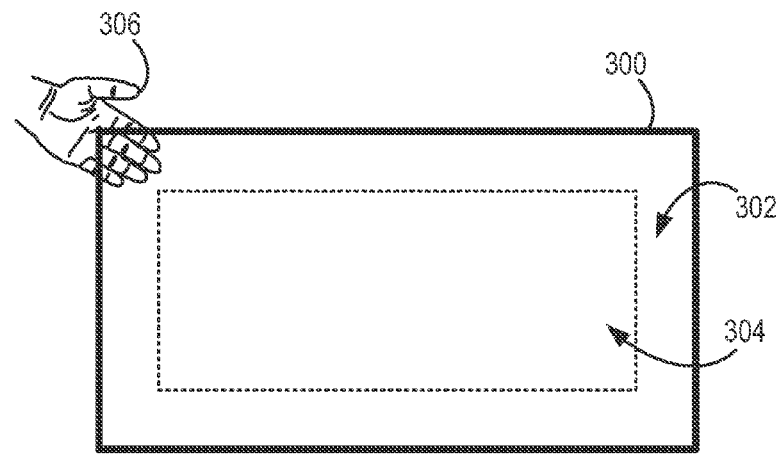
FIG. 3 schematically shows a method of adjusting a setting that varies power consumption and/or an image data collection rate for a portion of an image frame according to an embodiment of the present disclosure.

FIG. 3 schematically shows an embodiment of an image frame 300 divided into an edge region 302 and a central region 304. In the example shown in FIG. 3, device settings (e.g., light source settings, image sensor settings, and/or image processing settings) are initially configured so that power consumption is lower in central region 304 than in edge region 302. In response to detection of an initial presence of object 306, one or more device settings may be adjusted to increase power consumption in central region 304. In some embodiments according the example shown in FIG. 3, such settings may be adjusted in response to detection of objects within edge regions. As a more specific example, coherent illumination light may initially be directed via an illumination control stage to illuminate edge region 302 of a field of view of the image sensor, and then to illuminate both edge region 302 and central region 304 in response to detection of object 306. As another example, in an embodiment where a plurality of light sources are provided, each light source being directed toward a particular portion of the image sensor, power control to those light sources may be adjusted in response to detection of an object within a corresponding portion of the image sensor. Thus, detection of the object within edge region 302 may cause an increase in power supplied to the corresponding light source. Detection of the object within central region 304 may then cause an increase in power supplied to a light source illuminating the central region.

It will be appreciated that other settings may be adjusted that change the power consumption of the image acquisition device in response to detecting the object. For example, in some embodiments, a frame collection rate setting may be adjusted to vary power consumption for an image acquisition device. Increasing a rate at which frames of image data are collected may increase the power consumption for the image acquisition device. Thus, a setting for a frame collection rate may initially be set to a first, lower value until a change in a suitable threshold condition (e.g. initial presence of an object or a change in rate of motion of the object between image frames) is detected, in response to which the setting for the frame collection rate may be set to a second, higher value.

Additionally or alternatively, in some embodiments, adjustments made to a frame resolution setting may be used to vary power consumption for an image acquisition device. For example, in some embodiments, a frame resolution setting may be adjusted to vary power consumption for an image acquisition device in response to initial detection of an object. Increasing the number of pixels captured in each frame of image data may increase the amount of power consumed by the image acquisition device. In some embodiments, a setting for a frame resolution may initially be set to a first, lower value until an initial presence of the object is detected, after which the setting for the frame resolution may be set to a second, higher value. As another example, a frame resolution setting may be adjusted in response to detected changes in a threshold tracking condition related to the object. In this example, a setting for a frame resolution setting may be set to a first, lower value until it is determined that more image detail is desired for object tracking. In response to the detected change in the threshold tracking condition, the setting for the frame resolution setting may be adjusted to a second, higher value. For example, the frame resolution setting may be adjusted from 80×60 pixels to 320×240 pixels, or to any suitable frame resolution. In some embodiments, such adjustments may be made continuously at a predetermined rate (e.g., according to a predetermined change in resolution per time), though it will be appreciated that any suitable manner of adjusting the setting may be employed without departing from the scope of the present disclosure. Such adjustments may conserve power during conditions when less detail may be desired, permitting lower frame resolution settings that may extend power supply duration.

The adjustments described above each may affect the amount of image data collected per frame or per unit time, as shown in FIG. 2 at 216. For example, the amount of image data per unit time collected by an image sensor may be increased in situations where more image data is acquired (e.g. upon initial detection of an object, and/or while trying to image fine details or track fast motion). Likewise, an amount of image data per unit time collected by the image sensor may be decreased, for example, when no object is detected, and/or when less detailed image data may be used for tracking (e.g. when motion is slow, when tracking large body parts, etc.).

In some embodiments where a background region is identified, a predicted candidate exclusion region that is projected to exclude the object in a later image data frame may be identified within the background region. Identification of the candidate exclusion region may be based on object information extracted from a previously-received frame or series of frames based upon applied constraints. For example, in some embodiments, motion vector information and/or other kinetic information for a particular object extracted from previously-received frames may be extracted from a plurality of frames. The extracted motion vector information may provide a potential trajectory for that object based upon constraints related to the particular body part being tracked. In turn, adjustments may be made to a setting that decreases an image data per unit time collected by the image sensor within the candidate exclusion region in a later frame of image data.

It will be appreciated that adjustments may also be made to settings that affect an amount of object information extracted from image data and/or otherwise processed. By potentially simplifying downstream processing of the image data and/or increasing tracking efficiency, such adjustments may extend power source duration for a computing device. Thus, in some embodiments, adjusting a setting at 212 may include, at 218, adjusting an object information extraction parameter that changes the object information extraction process.

For example, in some embodiments, adjustments may be made to a segmentation resolution parameter that decreases an amount of object information extracted from image data. In some embodiments, such settings may be dynamically adjusted at a segmentation stage of an object tracking pipeline. In some settings, such an adjustment may result in downsampling the extracted image data to a lower processing resolution. Downsampling may allow the observed image data to be more readily utilized and/or processed with less computing overhead. Additionally or alternatively, in some settings, such an adjustment may include removing and/or smoothing noise variation included in the image data, which may enhance data integrity and/or downstream processing.

Figure 4:
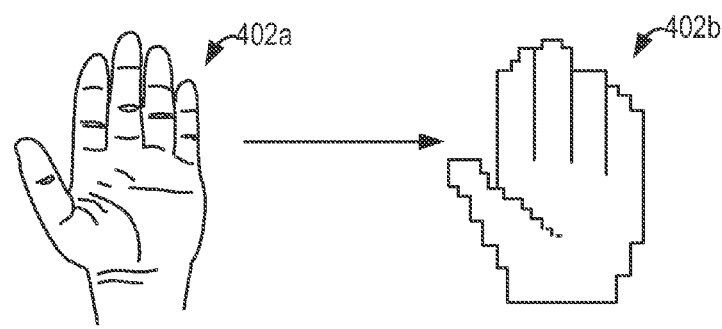
FIG. 4 schematically shows a method of adjusting a value of an object information extraction parameter for an object according to an embodiment of the present disclosure.

As another example, in some embodiments, adjustments may be made to a classification resolution parameter that decreases an amount of object information extracted from image data. In some embodiments, such settings may be dynamically adjusted at a classification stage of an object tracking pipeline. In some examples, reducing a number of pixels that are classified may reduce power consumption, potentially extending power supply lifetime. FIG. 4 schematically shows an embodiment of decreasing pixel classification resolution for an object from a first, higher classification resolution (shown at 402a) to a second, lower classification resolution (shown at 402b).

Figure 5:
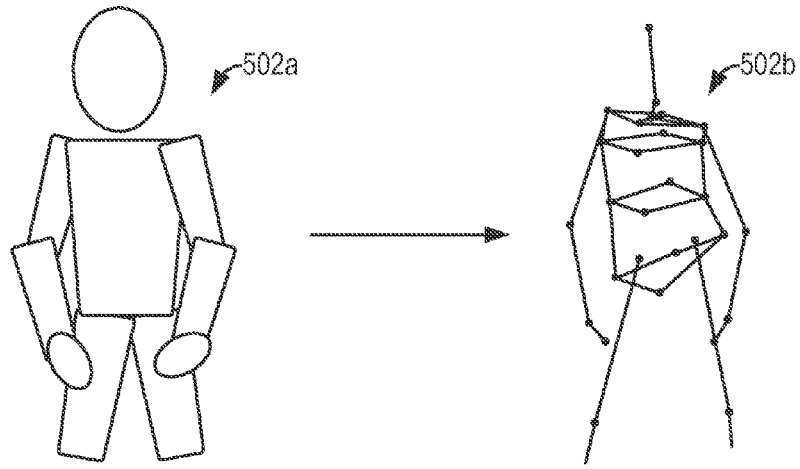
FIG. 5 schematically shows another method of adjusting a value of an object information extraction parameter for an object according to an embodiment of the present disclosure.

As yet another example, in some embodiments, adjustments may be made to a model fitting resolution parameter that decreases an amount of object information extracted from image data. In some embodiments, such settings may be dynamically adjusted at a model fitting stage of an object tracking pipeline. For example, in some embodiments, a resolution at which rasterized volumetric models may be compared with classified objects may be decreased in response to a setting adjustment. As another example, in some embodiments, a different type of representation may be selected at the model fitting stage in response to a setting adjustment. FIG. 5 schematically shows an embodiment of decreasing classification resolution for an object from a first, higher classification resolution using a volumetric representation (shown at 502a) to a second, lower classification using a skeletal resolution (shown at 502b). In some examples, reducing a number of pixels compared during model fitting, such as by downsampling the resolution or by selecting a different representation type, may reduce power consumption and/or speed processing at an application receiving the output from the pipeline.

While the examples described above relate to decreasing an amount of object information extracted from image data, it will be appreciated that in some other embodiments, adjustments may be made that increase an amount of object information extracted from image data. In some settings, additional information may be extracted in situations where higher levels of detail may assist in image processing. For example, higher frame collection rates may assist in tracking faster motion of the object. As another example, higher frame collection, segmentation, classification, and/or model fitting resolutions may assist when trying acquire and/or process the image data.

Further, in some embodiments, an adjustment in one setting that increases power consumption for one portion of a device may be accompanied by an adjustment to another setting that decreases power consumption in another portion of the device. In some examples, these competing adjustments may result in offsetting and/or net negative power consumption changes, potentially extending power supply lifetime in the device.

At 220, method 200 includes extracting object information from a second frame of image data using the adjusted setting. It will be appreciated that the second frame of image data may be a previously-received frame of image data or a subsequently-received frame of image data. In some embodiments, the adjusted setting may be applied by feeding the setting forward or backward in a pipeline.

FIG. 6 schematically shows another embodiment of a pipeline 600 for tracking object information. The embodiment of pipeline 600 includes the stages shown in pipeline 108, and includes an optional history tracking stage 602. The history tracking stage 602 shown in FIG. 6 may be used to track motion vector information and other pixel information from previously-collected frames used to identify candidate exclusion regions as described above. Pipeline 600 also illustrates an example location of a setting adjustment stage 604 for generating values used for adjusting the various pipeline and device settings described herein. Setting adjustment stage 604 includes an output 606 that is configured to provide feedback (shown at 608) input of setting values to various stages included in pipeline 600. However, it will be appreciated that in some embodiments, setting adjustment stage 604 may provide feedforward input to stages included in pipeline 600. In some embodiments, output from some stages may not be used to determine sensor adjustment settings. As one non-limiting example, information from a model fitting stage may not be used when determining a sensor adjustment setting. Additionally or alternatively, in some embodiments, output from setting adjustment stage 604 may not be provided to some stages within pipeline 600. It will be understood that such feedback and feedforward also may be used for the adjustments described above in the context of FIGS. 1A-1B and 2. It further will be appreciated that the order and arrangement of stages in pipeline 600 is provided for illustrative purposes only. Other arrangements, including non-serial arrangements, of the stages depicted in the embodiment of pipeline 600 shown in FIG. 6 are understood as being within the scope of the present disclosure. Further, in some embodiments, some of the stages shown in FIG. 6 may be omitted, while in some embodiments some other stages not shown in FIG. 6 may be included.

FIG. 7 schematically shows a non-limiting computing system 700 that may perform one or more of the above described methods and processes. Computing system 700 is shown in simplified form. It is to be understood that any computer architecture may be used without departing from the scope of this disclosure. In different embodiments, computing system 700 may take the form of a mainframe computer, server computer, desktop computer, laptop computer, tablet computer, home entertainment computer, network computing device, mobile computing device, mobile communication device, portable media device, gaming device, head-mounted display device, etc.

Computing system 700 includes a logic subsystem 702 and a data-holding subsystem 704. Computing system 700 may optionally include a display subsystem 706, a communication subsystem 708, and/or other components not shown in FIG. 7. Computing system 700 may also optionally include user input devices such as keyboards, mice, game controllers, cameras, microphones, and/or touch screens, for example.

Logic subsystem 702 may include one or more physical devices configured to execute one or more instructions. For example, logic subsystem 702 may be configured to execute one or more instructions that are part of one or more applications, services, programs, routines, libraries, objects, components, data structures, or other logical constructs. Such instructions may be implemented to perform a task, implement a data type, transform the state of one or more devices, or otherwise arrive at a desired result.

Logic subsystem 702 may include one or more processors that are configured to execute software instructions. Additionally or alternatively, logic subsystem 702 may include one or more hardware or firmware logic machines configured to execute hardware or firmware instructions. Processors of logic subsystem 702 may be single core or multicore, and the programs executed thereon may be configured for parallel or distributed processing. Logic subsystem 702 may optionally include individual components that are distributed throughout two or more devices, which may be remotely located and/or configured for coordinated processing. One or more aspects of logic subsystem 702 may be virtualized and executed by remotely accessible networked computing devices configured in a cloud computing configuration.

Data-holding subsystem 704 may include one or more physical, non-transitory, devices configured to hold data and/or instructions executable by logic subsystem 702 to implement the herein described methods and processes. When such methods and processes are implemented, the state of data-holding subsystem 704 may be transformed (e.g., to hold different data).

Data-holding subsystem 704 may include removable media and/or built-in devices. Data-holding subsystem 704 may include optical memory devices (e.g., CD, DVD, HD-DVD, Blu-Ray Disc, etc.), semiconductor memory devices (e.g., RAM, EPROM, EEPROM, etc.) and/or magnetic memory devices (e.g., hard disk drive, floppy disk drive, tape drive, MRAM, etc.), among others. Data-holding subsystem 704 may include devices with one or more of the following characteristics: volatile, nonvolatile, dynamic, static, read/write, read-only, random access, sequential access, location addressable, file addressable, and content addressable. In some embodiments, logic subsystem 702 and data-holding subsystem 704 may be integrated into one or more common devices, such as an application specific integrated circuit or a system on a chip.

FIG. 7 also shows an aspect of the data-holding subsystem in the form of removable computer-readable storage media 710, which may be used to store and/or transfer data and/or instructions executable to implement the herein described methods and processes. Removable computer-readable storage media 710 may take the form of CDs, DVDs, HD-DVDs, Blu-Ray Discs, EEPROMs, and/or floppy disks, among others.

It is to be appreciated that data-holding subsystem 704 includes one or more physical, non-transitory devices. In contrast, in some embodiments aspects of the instructions described herein may be propagated in a transitory fashion by a pure signal (e.g., an electromagnetic signal, an optical signal, etc.) that is not held by a physical device for at least a finite duration. Furthermore, data and/or other forms of information pertaining to the present disclosure may be propagated by a pure signal.

The terms "module," "program," and "engine" may be used to describe an aspect of computing system 700 that is implemented to perform one or more particular functions. In some cases, such a module, program, or engine may be instantiated via logic subsystem 702 executing instructions held by data-holding subsystem 704. It is to be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" are meant to encompass individual or groups of executable files, data files, libraries, drivers, scripts, database records, etc.

It is to be appreciated that a "service", as used herein, may be an application program executable across multiple user sessions and available to one or more system components, programs, and/or other services. In some implementations, a service may run on a server responsive to a request from a client.

When included, display subsystem 706 may be used to present a visual representation of data held by data-holding subsystem 704. As the herein described methods and processes change the data held by the data-holding subsystem, and thus transform the state of the data-holding subsystem, the state of display subsystem 706 may likewise be transformed to visually represent changes in the underlying data. Display subsystem 706 may include one or more display devices utilizing any suitable type of technology. Such display devices may be combined with logic subsystem 702 and/or data-holding subsystem 704 in a shared enclosure, or such display devices may be peripheral display devices.

When included, a communication subsystem 708 may be configured to communicatively couple computing system 700 with one or more other computing devices. Communication subsystem 708 may include wired and/or wireless communication devices compatible with one or more different communication protocols. As non-limiting examples, the communication subsystem may be configured for communication via a wireless telephone network, a wireless local area network, a wired local area network, a wireless wide area network, a wired wide area network, etc. In some embodiments, the communication subsystem may allow computing system 700 to send and/or receive messages to and/or from other devices via a network such as the Internet.

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. In a computing device, a method of detecting object information in image data collected by an image sensor, the method comprising:
receiving a frame of image data from the image sensor;
recognizing an object within the frame;
fitting a model to the object;
detecting a change in a threshold condition related to the model fit to the object, where detecting the change in the threshold condition related to the model fit to the object further comprises determining kinetic information for the object that provides a potential trajectory based on the kinetic information; and
adjusting a setting that changes a power consumption of the computing device in response to detecting the change in the threshold condition related to the model fit to the object and the potential trajectory for the object.

2. The method of claim 1, wherein adjusting the setting that changes the power consumption of the computing device comprises adjusting a hardware setting of the image sensor.

3. The method of claim 2, wherein adjusting the hardware setting of the image sensor comprises adjusting one or more of an illuminant setting, a resolution setting and a frame rate setting.

4. The method of claim 2, wherein adjusting the setting in response to the model fit to the object and the potential trajectory for the object comprises increasing an amount of image data collected per unit time.

5. The method of claim 2, wherein adjusting the setting in response to the model fit to the object and the potential trajectory for the object comprises decreasing an amount of image data collected per unit time.

6. The method of claim 2, wherein adjusting the setting in response to the model fit to the object and the potential trajectory for the object comprises adjusting a software setting in an image processing pipeline, the software setting comprising one or more of a segmentation resolution setting, a classification resolution setting, and a model fitting resolution setting.

7. The method of claim 1, where detecting the change in the threshold condition related to the model fit to the object further comprises generating a motion vector for the object based on the kinetic information, the motion vector providing the potential trajectory for the object.

8. The method of claim 1, further comprising:
tracking the object via the model fit to the object and a motion vector that provides the potential trajectory for the object;
identifying a region of the frame that does not include the object; and
adjusting a setting that decreases an image data per unit time collected by the image sensor within the region that does not include the object.

9. The method of claim 8, where identifying the region further includes identifying a candidate region that is projected to exclude the object in a subsequently-received frame based on the motion vector, the potential trajectory for the object, and object information extracted from image data included in a previously-received frame.

10. A computing system configured to receive image data from an image sensor and to extract object information from the image data, the computing system comprising:
a logic subsystem; and
a data holding subsystem storing instructions executable by the logic subsystem to:
receive from the image sensor a first image acquired at a first image collection setting,
recognize an articulated object in the first image, and
in response to recognizing the articulated object in the first image,
extract the articulated object from the first image;
analyze the articulated object extracted to identify a plurality of regions of the articulated object and a motion vector for the articulated object;
fit a model to the plurality of regions of the articulated object to determine potential trajectories for the articulated object based on the motion vector;
based upon the model and potential trajectories determined for the articulated object based on the motion vector, control the image sensor to change the first image data collection setting to a second image data collection setting in which more image data per unit time is collected than in the first image data collection setting; and
receive a second image from the image sensor acquired at the second image data collection setting.

11. The computing system of claim 10, further comprising instructions executable to adjust a setting in an image processing pipeline, the setting in the image processing pipeline comprising one or more of segmentation resolution information, classification resolution information, and model fitting resolution information.

12. The computing system of claim 10, where the instructions executable to adjust the image sensor setting include instructions that change a rate of image data acquisition based on the model and potential trajectories determined for the articulated object based on the motion vector.

13. The computing system of claim 10, where the instructions executable to change power consumption for the image sensor include instructions executable to increase power consumption for the image sensor.

14. The computing system of claim 10, where the instructions executable to change power consumption for the image sensor include instructions executable to change one or more of an illumination setting, a frame rate setting, and a resolution setting for the image sensor.

15. The computing system of claim 10, further comprising instructions executable to:
identify a background region of the first image that does not include the articulated object in response to recognizing the object;
adjust a setting that decreases an image data per unit time collected by the image sensor within the background region in response to identifying the background region; and
identify a candidate region that is projected to exclude the articulated object in a subsequently-collected image based on the model, the potential trajectories determined for the articulated object based on the motion vector, and object information extracted from image data included in a previously-collected image.

16. A computer-readable device comprising instructions stored thereon that are executable to:
obtain a first image, the first image having an edge region having a higher resolution and a central region having a lower resolution;
recognize an object in the edge region of the first image;
responsive to recognizing the object in the edge region of the first image, determine kinetic information for the object and generate a motion vector to determine a potential trajectory for the object; and based on the potential trajectory for the object, obtain a second image, the second image having a higher resolution in the central region than the first image.

17. The computer-readable device of claim 16, further comprising instructions executable to adjust one or more of a segmentation resolution setting, a classification resolution setting, and a model fitting resolution setting in response to recognizing the object based on the potential trajectory for the object.

18. The computer-readable device of claim 16, further comprising instructions executable to adjust a setting for an image sensor based on the potential trajectory for the object that increases power consumption for the image sensor in response to recognizing the object in the first image.

19. The computer-readable device of claim 16, further comprising instructions executable to control an image data collection setting for an image sensor based on the potential trajectory for the object to change a first image data collection setting to a second image data collection setting in which more image data per unit time is collected than in the first image data collection setting in response to recognizing the object in the first image and the potential trajectory for the object.

20. The computer-readable device of claim 19, further comprising instructions executable to
    identify a background region of the second image that does not include the object in response to recognizing the object and the potential trajectory for the object; and
    adjust a setting that decreases an image data per unit time collected by the image sensor within the background region in response to identifying the background region.

\* \* \* \* \*